US008049375B2

(12) United States Patent
Cheuk

(10) Patent No.: US 8,049,375 B2
(45) Date of Patent: Nov. 1, 2011

(54) ELECTROMAGNETIC TRANSDUCER APPARATUS

(75) Inventor: Chun Fai Cheuk, Redditch (GB)

(73) Assignee: The Hymatic Engineering Company Limited, Bracknell, Berkshire (GB)

( * ) Notice: Subject to any disclaimer, the term of this patent is extended or adjusted under 35 U.S.C. 154(b) by 272 days.

(21) Appl. No.: 12/294,449

(22) PCT Filed: Mar. 14, 2007

(86) PCT No.: PCT/GB2007/000875
§ 371 (c)(1),
(2), (4) Date: Nov. 29, 2008

(87) PCT Pub. No.: WO2007/110578
PCT Pub. Date: Oct. 4, 2007

(65) Prior Publication Data
US 2010/0061867 A1    Mar. 11, 2010

(30) Foreign Application Priority Data

Mar. 25, 2006  (GB) ................................. 0606039.6

(51) Int. Cl.
*H02K 33/00* (2006.01)
(52) U.S. Cl. ............................. 310/15; 310/17; 417/417
(58) Field of Classification Search ............... 310/12.04, 310/12.17, 12.18, 12.24, 12.25, 15, 17, 20–21, 310/28–29, 36–38; 417/363, 415–417; 92/130 R, 92/132, 135
See application file for complete search history.

(56) References Cited

U.S. PATENT DOCUMENTS

| 2,142,094 | A | * | 1/1939 | Dorn ........................ 310/156.08 |
| 3,910,729 | A | | 10/1975 | Jepsen et al. |
| 4,674,178 | A | * | 6/1987 | Patel ................................ 29/598 |
| 5,012,144 | A | * | 4/1991 | Huitema et al. ................ 310/14 |
| 5,174,117 | A | | 12/1992 | Naito et al. |
| 6,326,706 | B1 | * | 12/2001 | Zhang ........................ 310/12.31 |
| 6,404,086 | B1 | * | 6/2002 | Fukasaku et al. .............. 310/89 |
| 2003/0006870 | A1 | * | 1/2003 | Ohya ............................. 335/220 |
| 2006/0018771 | A1 | * | 1/2006 | Song et al. .................... 417/416 |

FOREIGN PATENT DOCUMENTS

| CN | 1554868 | | 12/2004 |
| EP | 1045145 | A1 | 10/2000 |
| JP | 11324914 | | 11/1999 |
| JP | 2002339863 | | 11/2002 |
| WO | 9012961 | | 11/1990 |
| WO | 03026107 | A2 | 3/2003 |

* cited by examiner

*Primary Examiner* — Tran Nguyen
(74) *Attorney, Agent, or Firm* — MacMillan, Sobanski & Todd, LLC

(57) ABSTRACT

An electromagnetic transducer apparatus (10) includes a core (30, 31) providing a pair of yokes (34, 35) between which there is an air gap (38, 39), at least one coil (32) disposed about the core (30, 31), an armature (14) moveable in the air gap (38, 39) in response to the coil (32) being energised, the armature (14) being mounted between a pair of suspension springs (22, 23), and characterized in that the armature (14) includes a cylinder (14) in which is disposed a piston (12) which is immovable relative to the core (30, 31).

18 Claims, 2 Drawing Sheets

ELECTROMAGNETIC TRANSDUCER APPARATUS

This invention relates to an electromagnetic transducer apparatus which may be used for example as a linear motor, for driving a compressor such as may be used in a refrigerator, as a pressure pulsator or pump, or as a fluid e.g. pneumatically, driven electric generator.

In WO 03/026107 there is disclosed an electromagnetic transducer which is a linear motor, which may be used for driving a compressor. In the arrangement described there is a rectangular armature which is a permanent magnet or electromagnet, which is moved in air gaps provided between yokes of a core. The armature is connected externally of the core to a piston which moves in a remote cylinder to provide pumping. The armature may be mounted on suspension springs which constrain the motion of the armature to along an axis, and the piston is provided with no peripheral sealing with the cylinder in which the piston reciprocates.

This geometry, utilising a rectangular armature, can result in unbalanced radial forces if the rectangular armature is not perfectly aligned in the air gap between the poles. This imbalance can result in the piston contacting the cylinder, resulting in friction, wear and loss of performance.

According to one aspect of the invention we provide an electromagnetic transducer apparatus including a core providing a pair of yokes between which there is an air gap, at least one coil disposed about the core, an armature moveable in the air gap in response to the coil being energised, the armature being mounted between a pair of suspension springs, and characterised in that the armature includes a cylinder in which is disposed a piston which is immovable relative to the core.

Thus in contrast to the arrangement disclosed in WO 03/026107, the armature is not connected externally of the core to a piston, but a chamber for pumping, or for driving the generator, is provided by the armature itself which includes the cylinder, which moves relative to the piston when the coil is energised, or which energises the coil when the piston and cylinder are relatively moved. Thus the pumping or driving chamber and the motor/generator, are integrated.

As the armature/cylinder is mounted between the pair of suspension springs, the overall length of the pump can be reduced compared with that in WO 03/026107 in which the piston is external to the core. Moreover the moving cylinder geometry, permits of a compact coaxial pump design. For the same suspension spring axial stiffness, the arrangement of the present invention gives the cylinder higher radial stiffness than with the arrangement of WO03/02617.

In one embodiment the cylinder carries externally, a ring of conductive material, which is centred on the cylinder axis. For example, the cylinder may include a pair of external circumferential formations between which the ring is located, which formations in use may transmit a driving force between the ring and the cylinder, although the ring may alternatively or additionally be located by at least one fastener and/or adhesive or otherwise.

In one arrangement, the ring is a ring magnet magnetised along a diameter of the ring magnet which extends between the yokes of the core, or at least the axis of magnetisation of the ring magnet is parallel to the direction of magnetic flux across the air gap between the pair of yokes when the coil is energised.

In each case, desirably the yokes each present to the cylindrical external surface of the ring, a part-cylindrical surface having a curvature corresponding to the curvature of the ring, whereby the yokes are continuously close to the cylindrical external surface of the ring.

In another embodiment the cylinder carries externally a pair of magnets which are each magnetised in the same direction i.e. parallel to the direction of magnetic flux across the air gap between the pair of yokes, and preferably are carried on the cylinder so as to lie adjacent the yokes.

In this case, desirably the cylinder carries externally a ring of magnetic material which may include formations to locate the magnets, although again, if desired, instead of or in addition to such locating formations, the magnets may be located by at least one fastener and/or adhesive. The magnetic material joins the flux paths of the two magnets thus conducting the magnetic flux to the exterior of the cylinder at least to reduce any magnetic damping effect on the movement of the cylinder relative to the piston.

In a preferred embodiment, the core provides a first flux path and a second flux path is provided by a second core of similar construction to the first mentioned core and thus having a second pair of yokes which provide a second air gap therebetween, there being a second coil disposed about the second core. The first air gap provided between the yokes of the first core and the second air gap may be positioned adjacent one another along the cylinder axis, and the first mentioned and second coils may be positioned on opposite sides of a longitudinal plane in which the cylinder axis lies.

According to a second aspect of the invention we provide a pressure pulstator or pump, which includes an electromagnetic transducer apparatus according to the first aspect of the invention.

According to a third aspect of the invention we provide an electrical generator including an electromagnetic transducer according to the first aspect of the invention.

Embodiments of the invention will now be described with reference to the accompanying drawings in which:—

Figure 1:
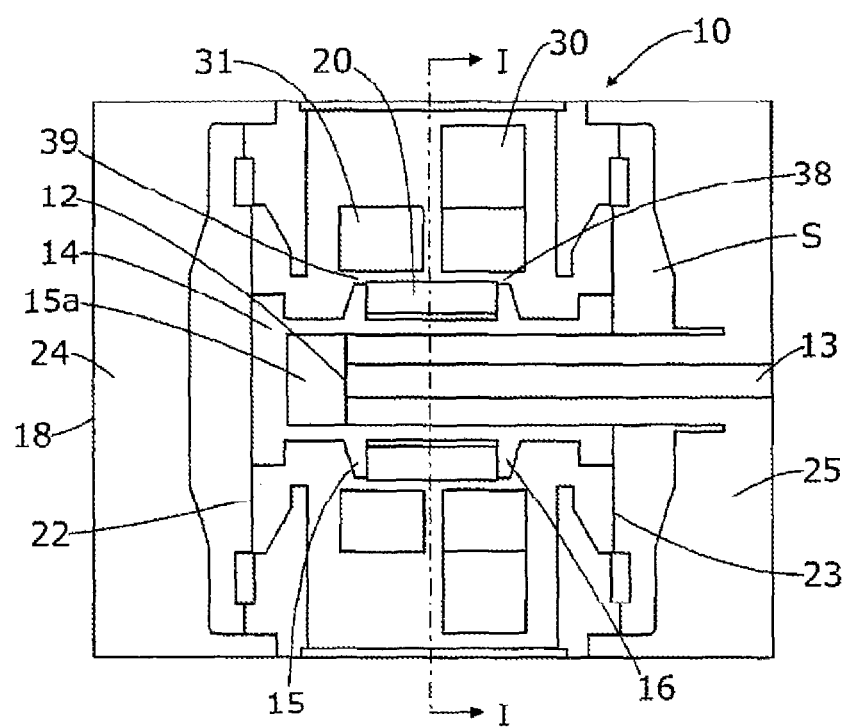
FIG. 1 is a side illustrative view of a pump including an electromagnetic transducer in accordance with the invention.
Figure 2:
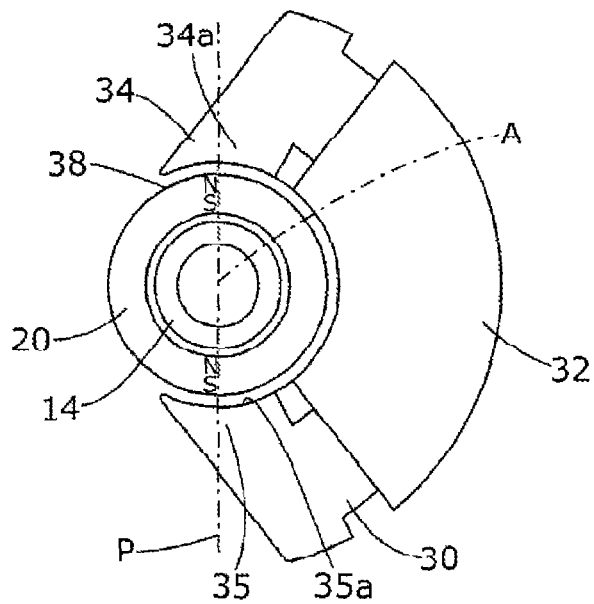
FIG. 2 is an illustrative cross sectional view of the pump of FIG. 1 taken on the line II-II.
Figure 2A:
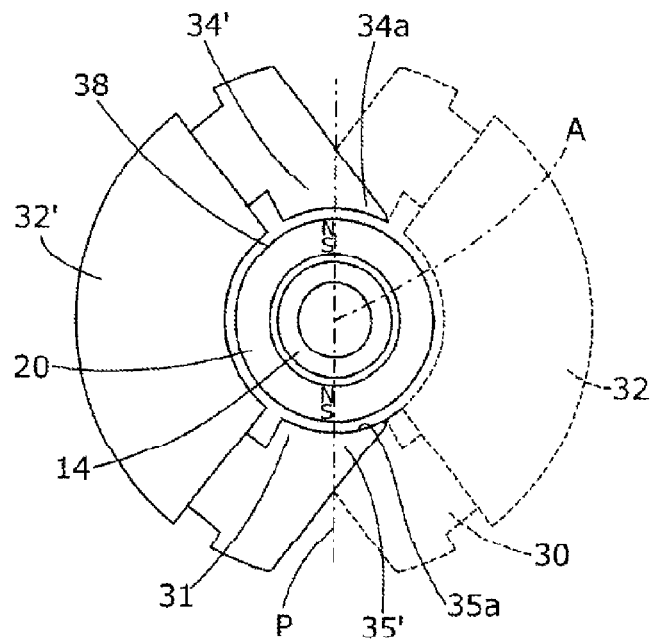
Figure 3:
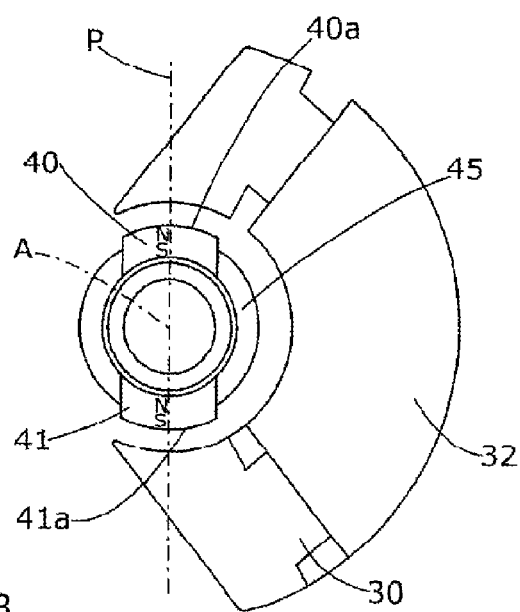

FIG. 2*a* is an illustrative cross sectional view of the pump of FIG. 1 taken in an opposite direction to that of FIG. 2; and FIG. 3 is a view similar to FIG. 2 but of another pump embodying the invention.

Referring to FIGS. 1 and 2 of the drawings there is shown a pump 10 which may be used for compressing fluid, such as refrigerant in a refrigerator. However the pump has many other applications and references in this description to the use of the pump for compressing refrigerant are purely exemplary. Also, the term "pump" is not intended to imply that the invention is not applicable to pressure pulsators generally, which may compress, or de-compress fluid.

The pump 10 is constituted by a piston 12 which is only drawn diagrammatically in FIG. 1, and cylinder 14 which define between them, as the cylinder 14 moves relative to the piston 12, a pumping chamber 15*a*. Inlet and outlet ports of the cylinder 14 which are covered and uncovered by the piston 12 as the cylinder moves, and fluid flow paths to and from the pumping chamber 15*a* are not shown.

The pumping chamber 15*a* is integrated with a linear drive motor which drives the cylinder 14 relative to the piston 12. The piston 12 is carried on a piston rod 13 which is fixed relative to a housing 18 of the pump 10 and thus is immovable.

The cylinder 14 carries externally, a ring magnet 20. To locate the ring magnet, the cylinder 14 is provided externally, with a pair of locating formations 15, 16 which preferably each extend circumferentially about the cylinder 14. Thus the locating formations 15, 16 may transmit a driving force between the ring magnet 20 and the cylinder 14. Alternatively or additionally, the ring magnet 20 may be located on the exterior of the cylinder 14 by one or more fasteners and/or by adhesive. In each case, as the magnet 20 is driven linearly along a cylinder axis A as described below, the cylinder 14 will be driven substantially linearly to and fro along the cylinder axis A.

The cylinder 14 is mounted at each end to a respective suspension spring 22, 23. The suspension springs 22, 23 allow linear movement of the cylinder 14 along the cylindrical axis A, substantially accurately maintaining the linearity of such movement, and minimising radial distortion.

The suspension springs 22, 23 may each be provided by a group of one or more spiral springs, which provide high radial stiffness, but low resistance against tilt. By mounting the cylinder 14 between two such groups of spiral springs 22, 23, the bending effects on the springs are minimised thus improving the radial rigidity of the suspension.

The suspension springs 22, 23 are each mounted by a respective housing end wall 24, 25.

The pump 10 further includes first and second cores 30, 31, which are provided side by side along the cylinder axis A. The first and second cores 30, 31 are of similar construction to each other, and the construction of the first core 30 which is seen in FIG. 2 will be described in detail.

The first core 30 includes a segment of magnetic material, for example provided by a solid or laminated ferrous material, about which a first coil 32 is wound. The first core 30 provides a pair of yokes 34, 35, each of which presents a part cylindrical surface 34*a*, 35*a* which is centred on the cylinder axis A, the pair of yokes 34, 35 being diametrically opposite one another. Between the yokes 34, 35 is a first air gap 38 in which the cylinder 14 and ring magnet 20 sub-assembly is provided.

As is indicated in FIG. 2 by the indicators "n" and "s" which indicate the north and south magnetic poles, the ring magnet 20 is magnetised along a diameter of the ring magnet 20 which extends between the yokes 34, 35 of the first core 30, i.e. the axis of magnetisation of the ring magnet 20 is parallel to the direction of magnetic flux across the first air gap 38 between the pair of yokes 34, 35 when the first coil 32 is energised.

The second core 31 (as shown in more detail in FIG. 2*a*) is similar in construction to the first core 30, with a second coil 32', but at least that part of the second core 31 about which the second coil 32' is wound, lies at an opposite side of a plane P which contains the cylindrical axis A, but the yokes 34', 35' of the second core 31 are positioned immediately adjacent the yokes 34, 35 of the first core 30, and provide between them a second air gap 39 aligned axially with the first air gap 38 and in which second air gap 39 the cylinder 14 and magnet 20 sub-assembly in use, also reciprocates.

In use the first coil 32 and second coil 32' are energised with an alternating or at least switched current. In response, the ring magnet 20 and hence the cylinder 14 moves linearly to and fro along the cylinder axis A in the air gaps 38, 39, the instantaneous direction of cylinder 14 movement depending upon the direction of the current applied. Thus the cylinder 14 and magnet 20 sub-assembly is an armature of a linear motor provided by the cores 30, 31, coils 32, 32' and the sub-assembly. As the cylinder 14 moves linearly relative to the piston 12, inlet and outlet ports (where provided) of the pumping chamber 15 are opened and closed thus to pump fluid.

Typically the electrical current applied to the coils 32, 32' is alternating or switched at a frequency of for example between 50 and 75 Hertz, the suspension springs 14, 15 assisting arresting of cylinder 14 movement at each extreme of travel as the current direction reverses, and the commencing of movement in the opposite direction.

Referring to FIG. 3, an alternative embodiment is shown which is similar in construction to the embodiment already described.

However instead of a ring magnet 20 being carried externally by the cylinder 14, the cylinder 14 carries a pair of individual magnets 40, 41. The magnets 40, 41 are each carried externally of the cylinder 14 so as to be positioned adjacent the yokes 34, 35 of the first and second cores 30, 31. The pair of magnets 40, 41 are each magnetised in the same direction i.e. parallel to the direction of magnetic flux across the air gaps 38, 39 between the pairs of yokes, 34, 35.

Each magnet 40, 41 has a radially outward surface 40*a*, 41*a* which is part cylindrical and thus lies close to the adjacent part-cylindrical surfaces 34*a*, 35*a* of the yokes 34, 35.

In this case, desirably the cylinder 14 carries externally a ring 45 of magnetic material which may include formations to locate the magnets, 40, 41 although if desired, instead of or in addition to such locating formations, the magnets 40, 41 may be located by one or more fasteners and/or adhesive. The magnetic material of the ring 45 joins the flux paths of the two magnets 40, 41 thus conducting the magnetic flux when the coils 32 are energised, between the yokes 34, 45 to the exterior of the cylinder 14 at least to reduce any magnetic damping effect on the movement of the cylinder 14 relative to the piston 12.

In the FIG. 1 embodiment, this conduction of magnetic flux between the yokes 34, 35 is provided through the ring magnet 20.

Various modifications may be made without departing from the scope of then invention.

For example, the yokes 34, 35 provided by the cores, and the windings of the coils 32 may be configured otherwise than as described, although preferably the coils 32 wound about the first and second cores 30, 31 are positioned at opposite sides of the plane P and the air gaps 38, 39 are adjacent one another along the cylindrical axis A.

Whereas in the drawings it is indicated that the pump housing 18 has end walls 24, 25 between which the cores 30, 31 are positioned. And the cylinder 14 linearly reciprocates in a space S provided between the end walls 24, 25, the pump housing 18 may be alternatively configured.

In another embodiment (not shown) instead of the cylinder 14 carrying a ring magnet 20, or a pair of individual magnets 40, 41, the cylinder 14 may carry a ring of conducting material and the armature moves in response to a changing electrical field generated by the coils 32 of the cores 30, 31, in the manner of a switched reluctance linear motor.

In yet another embodiment, the apparatus shown and described may be utilised for generating electrical energy, by relatively moving the piston 12 and cylinder 14, for example by introducing fluid, such as compressed air, into the chamber 15*a* between the piston 12 and cylinder 14, which in such an embodiment constitutes a driving chamber rather than a pumping chamber. In each case, the apparatus is an electromagnetic transducer either converting electrical energy to cylinder 14 movement, or cylinder 14 movement to electrical energy.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An electromagnetic transducer apparatus including a core providing a pair of yokes between which there is an air gap, at least one coil disposed about the core, an armature mounted between a pair of suspension springs and moveable in the air gap in response to magnetic flux extending across the air gap when the at least one coil is energized, said armature including a cylinder having an axis, and a piston which is immovable relative to said core disposed within said cylinder, said cylinder and piston limiting said armature to reciprocating movement in the air gap in the direction of the cylinder axis.

2. An apparatus according to claim 1 and wherein a chamber is provided between said armature and said piston.

3. An apparatus according to claim 1 wherein said cylinder carries externally, a ring of conductive material, which is centred on the cylinder axis.

4. An apparatus according to claim 3 wherein said cylinder includes a pair of external circumferential formations, and wherein said ring is located between said circumferential formations.

5. An apparatus according to claim 4 wherein said circumferential formations in use, transmit a driving force between said ring and said cylinder.

6. An apparatus according to claim 3 wherein said ring is located on said cylinder by at least one of a fastener and adhesive.

7. An apparatus according to claim 3 wherein said ring is a ring magnet magnetised having an axis of magnetisation, and wherein said axis of magnetisation is parallel to direction of magnetic flux across the air gap between the pair of yokes when the coil is energised.

8. An apparatus according to claim 7 wherein said ring magnet is magnetised along a diameter of the ring magnet which extends between said core yokes.

9. An apparatus according to claim 7 wherein said core yokes each present to a cylindrical external surface of said ring magnet, a part cylindrical surface having a curvature corresponding to the curvature of said ring magnet, whereby said yokes are continuously close to the cylindrical external surface of said ring magnet.

10. An apparatus according to claim 1 wherein the cylinder carries externally a pair of magnets which are each magnetised in the same direction and parallel to the direction of magnetic flux across said air gap between said pair of yokes.

11. An apparatus according to claim 10 wherein said magnets are carried on said cylinder adjacent the yokes.

12. An apparatus according to claim 10 wherein said cylinder carries externally a ring of magnetic material which joins the flux paths of said pair of magnets, and wherein said ring of magnetic material conducts the magnetic flux from said pair of magnets to the exterior of the cylinder.

13. An apparatus according to claim 12 wherein said ring of magnetic material includes formations to locate said pair of magnets.

14. An apparatus according to claim 12 wherein said pair of magnets are located by at least one of a fastener and adhesive.

15. An apparatus according to claim 1 wherein said core is a first core which provides a first flux path, wherein a second flux path is provided by a second core having a second pair of yokes which provide a second air gap therebetween, and including a second coil disposed about the second core.

16. An apparatus according to claim 15 wherein the first air gap provided between the yokes of said first core and the second air gap are positioned adjacent one another along an axis of said cylinder, and said first and second coils are positioned on opposite sides of a longitudinal plane in which the cylinder axis lies.

17. A pressure pulsator or pump which includes an electromagnetic transducer apparatus including a core providing a pair of yokes between which there is an air gap, at least one coil disposed about said core, an armature movable in the air gap in response to said coil being energized, wherein said armature is mounted between a pair of suspension springs, and wherein said armature includes a cylinder in which is disposed a piston which is immovable relative to said core whereby said armature is restricted to reciprocating movement relative to said core.

18. An electrical generator which includes an electromagnetic transducer apparatus including a core providing a pair of yokes between which there is an air gap, at least one coil disposed about said core, an armature moveable in the air gap in response to said coil being energized, wherein said the armature is mounted between a pair of suspension springs, and wherein said armature includes a cylinder in which is disposed a piston which is immovable relative to said core whereby said armature is restricted to reciprocating movement relative to said core.

* * * * *